(12) United States Patent
Smith

(10) Patent No.: US 6,338,317 B1
(45) Date of Patent: Jan. 15, 2002

(54) ANIMAL SHELTER

(76) Inventor: Wanda H. Smith, 6236 Blue Bonnet La., Winston-Salem, NC (US) 27103

( * ) Notice: Subject to any disclaimer, the term of this patent is extended or adjusted under 35 U.S.C. 154(b) by 0 days.

(21) Appl. No.: 09/540,507

(22) Filed: Mar. 31, 2000

(51) Int. Cl.[7] ................................................. A01K 1/00
(52) U.S. Cl. ...................... 119/482; 119/486; 119/498
(58) Field of Search ................. 119/57.8, 165, 119/334, 347, 482, 498, 500, 501, 486; 43/1

(56) References Cited

U.S. PATENT DOCUMENTS

| | | | |
|---|---|---|---|
| 45,080 A | * 11/1864 | Sage et al. | ................... 119/498 |
| 920,975 A | * 5/1909 | Minion | ........................ 119/482 |
| 1,123,300 A | * 1/1915 | Irwin | ......................... 119/334 |
| 1,549,229 A | 8/1925 | Smithline | |
| 1,721,649 A | * 7/1929 | Tweet | .......................... 119/334 |
| 2,034,156 A | 3/1936 | Snider | |
| 2,795,208 A | 6/1957 | Rasmussen | |
| 2,854,948 A | * 10/1958 | Drayson | ..................... 119/482 |
| 4,006,713 A | 2/1977 | Hawley, III | |
| D366,541 S | 1/1996 | Bradburn et al. | |
| 5,809,936 A | 9/1998 | Wall | |

* cited by examiner

Primary Examiner—Robert P. Swiatek

(57) ABSTRACT

A animal shelter for providing an animal protection from the elements while using the advantages of soil temperature as the seasons change. The animal shelter includes a bottom wall, a back wall, a first side wall and a second side wall. The bottom wall and the side walls each has a front edge, and the side and back walls each has a top edge. The bottom wall has a depression therein. The depression is generally positioned in a central area of the bottom wall. A cover portion may be abutted against the top edges of the back and side walls such that the cover portion is spaced from the bottom wall.

16 Claims, 4 Drawing Sheets

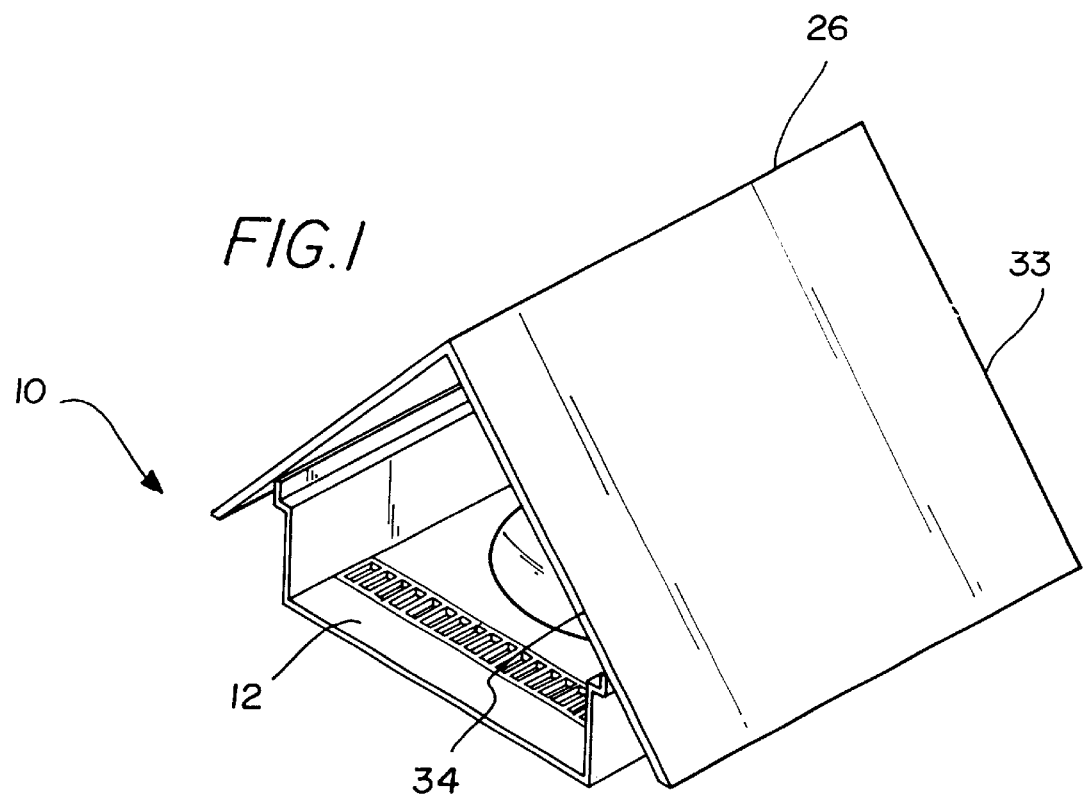
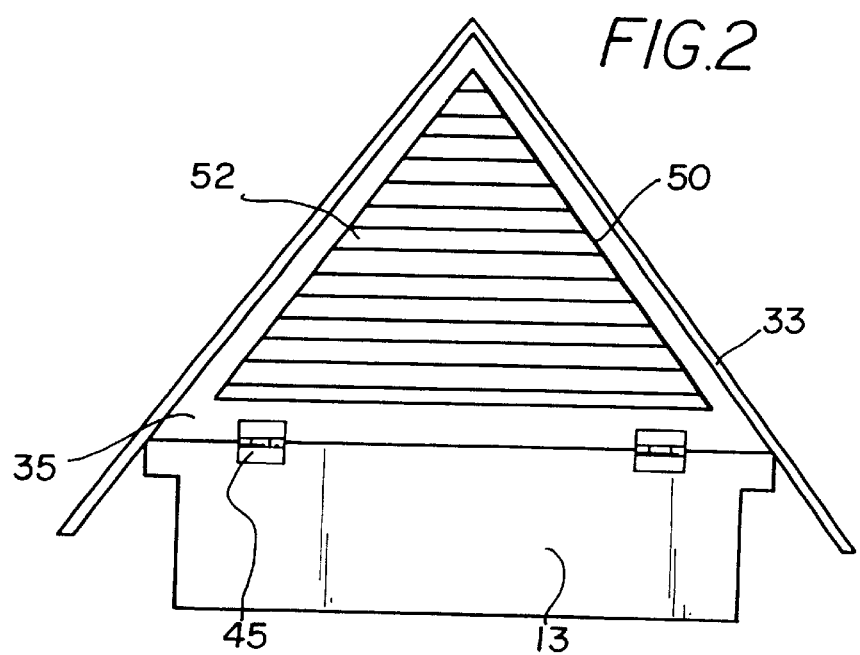

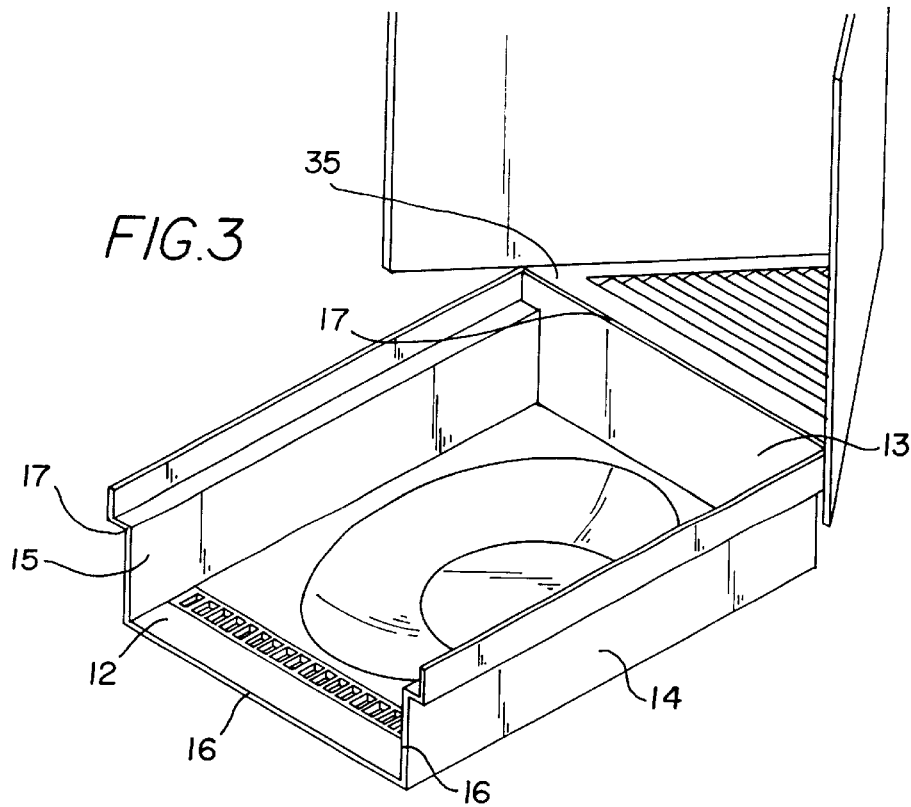
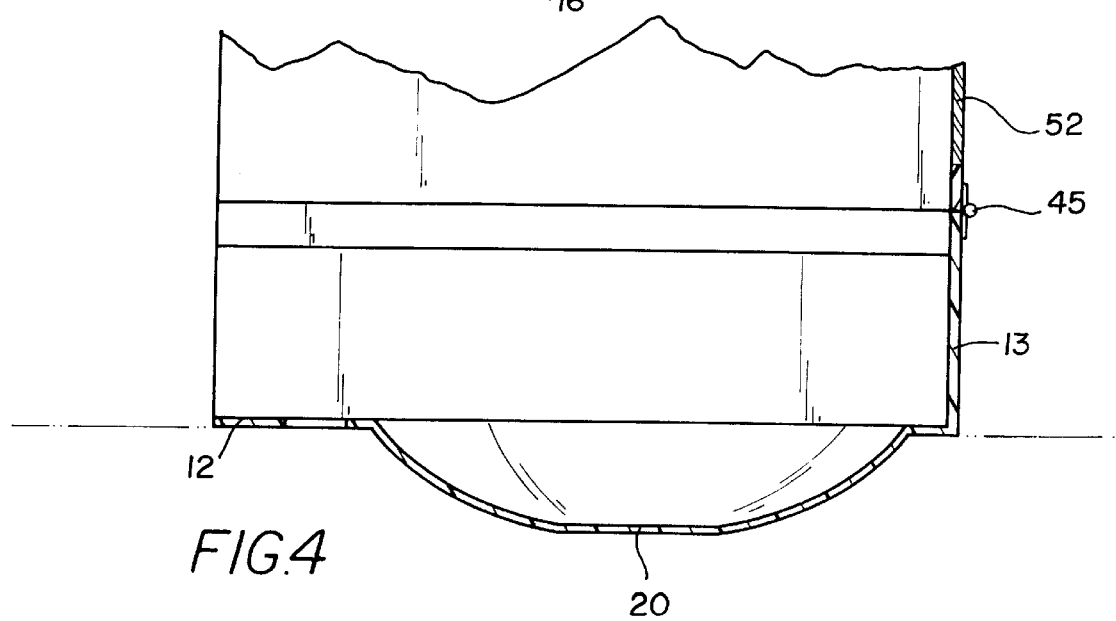

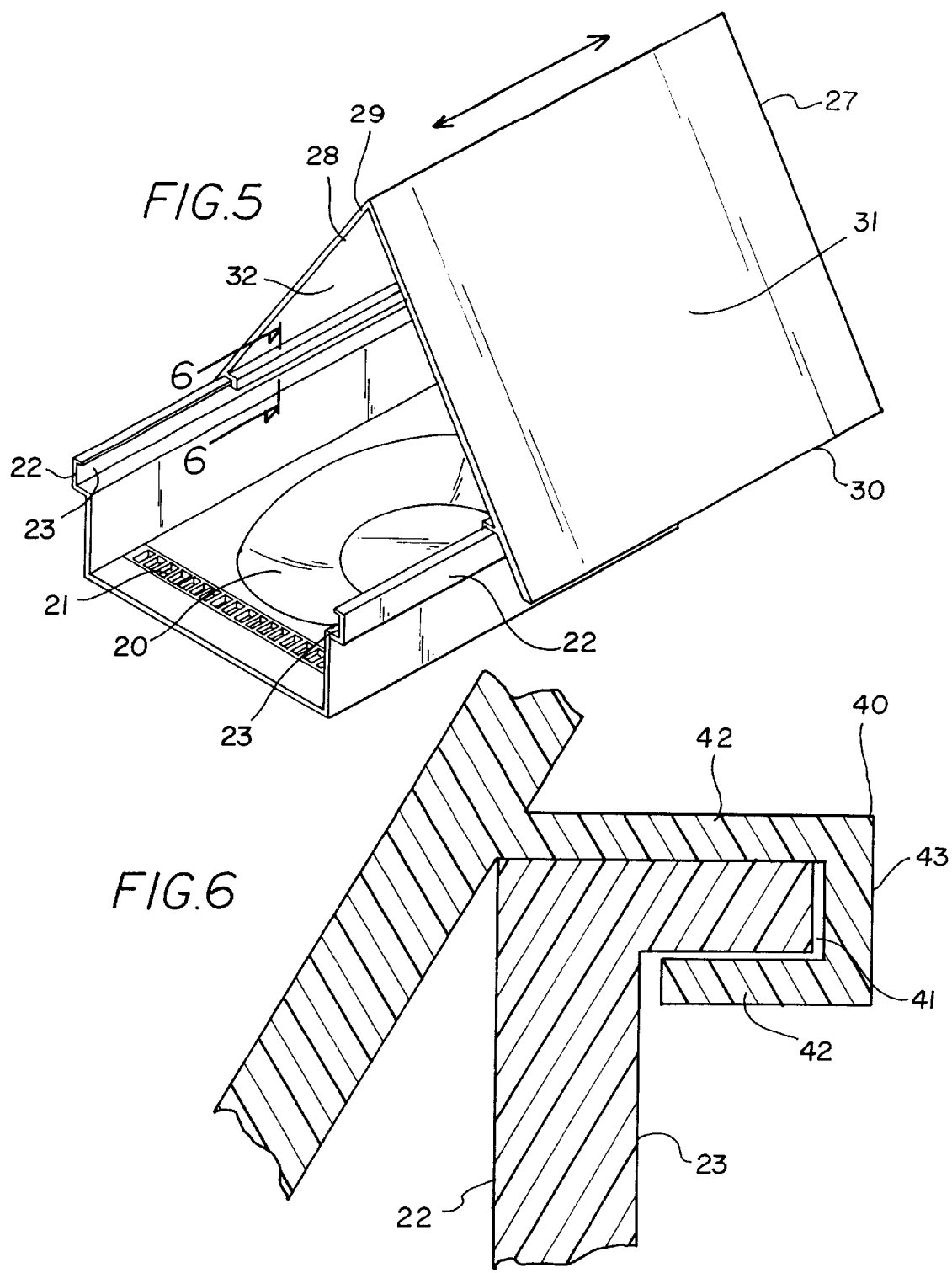

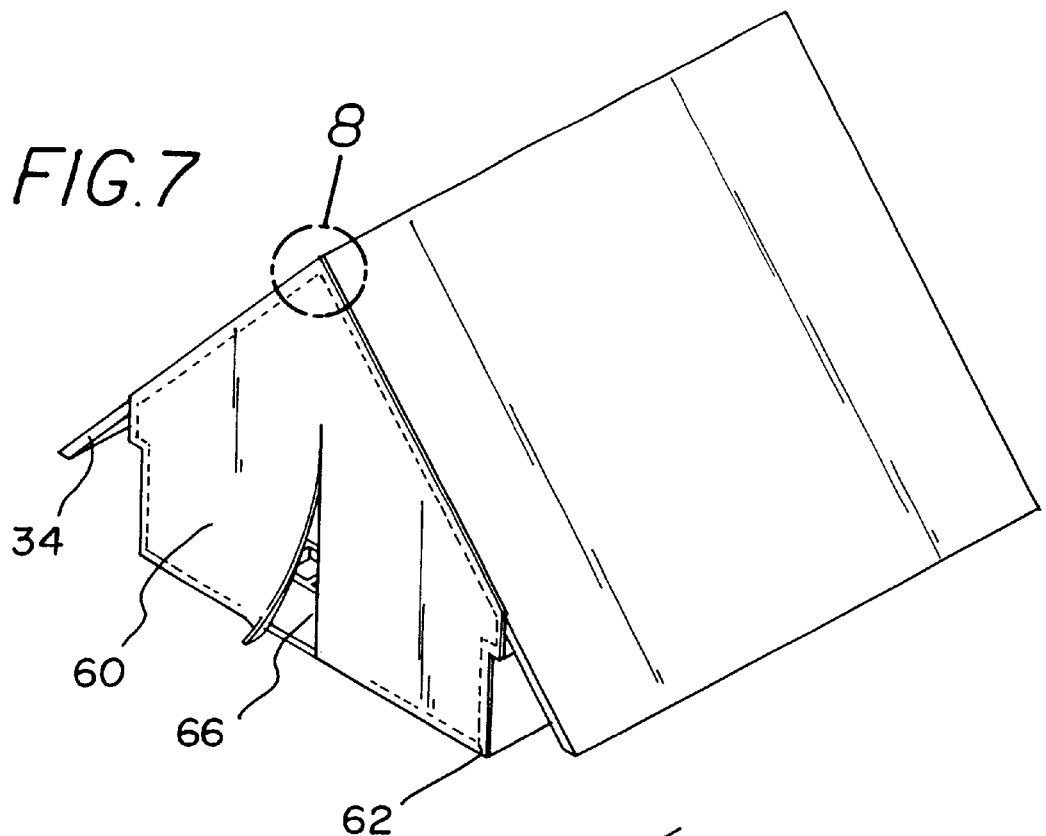
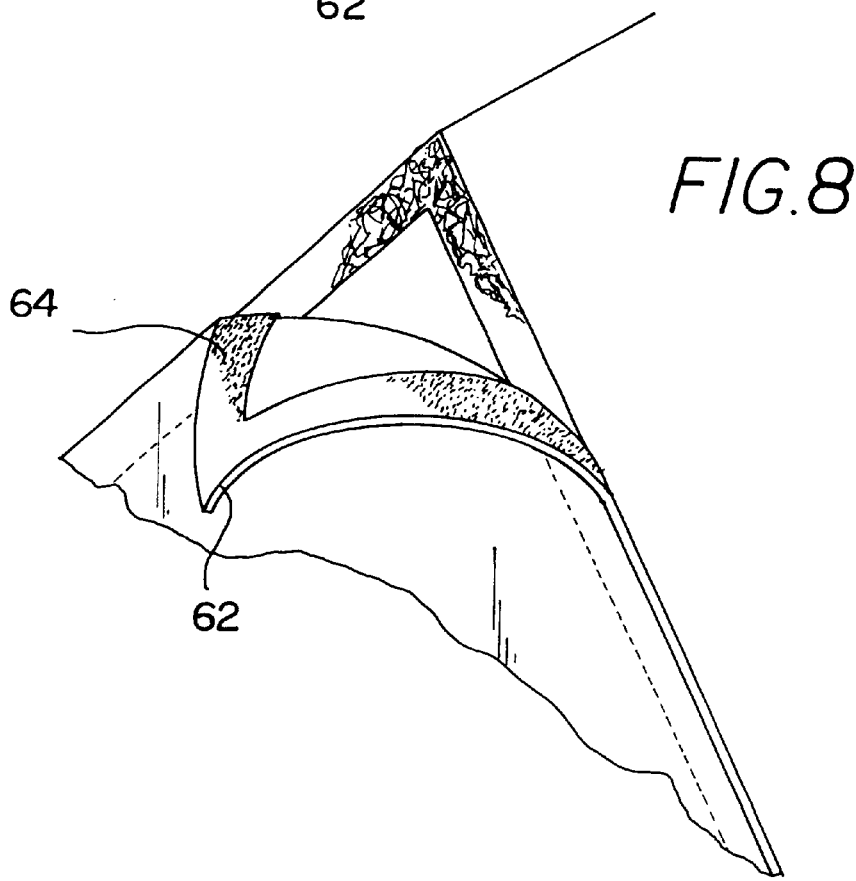

ANIMAL SHELTER

BACKGROUND OF THE INVENTION

1. Field of the Invention

The present invention relates to doghouses and more particularly pertains to a new animal shelter for providing an animal protection from the elements while using the advantages of soil temperature as the seasons change.

2. Description of the Prior Art

The use of doghouses is known in the prior art. More specifically, doghouses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,809,936; U.S. Pat. No. 2,034,156; U.S. Pat. No. 1,549,229; U.S. Pat. No. 2,795,208; U.S. Pat. No. 4,006,713; and U.S. Des. Pat. No. 366,541.

While these devices fulfill their respective, particular objectives and requirements, the aforementioned patents do not disclose a new animal shelter. The inventive device includes a bottom wall, a back wall, a first side wall and a second side wall. The bottom wall and the side walls each has a front edge, and the side and back walls each has a top edge. The bottom wall has a depression therein. The depression is generally positioned in a central area of the bottom wall. A cover portion may be abutted against the top edges of the back and side walls such that the cover portion is spaced from the bottom wall.

In these respects, the animal shelter according to the present invention substantially departs from the conventional concepts and designs of the prior art, and in so doing provides an apparatus primarily developed for the purpose of providing an animal protection from the elements while using the advantages of soil temperature as the seasons change.

SUMMARY OF THE INVENTION

In view of the foregoing disadvantages inherent in the known types of doghouses now present in the prior art, the present invention provides a new animal shelter construction wherein the same can be utilized for providing an animal protection from the elements while using the advantages of soil temperature as the seasons change.

The general purpose of the present invention, which will be described subsequently in greater detail, is to provide a new animal shelter apparatus and method which has many of the advantages of the doghouses mentioned heretofore and many novel features that result in a new animal shelter which is not anticipated, rendered obvious, suggested, or even implied by any of the prior art doghouses, either alone or in any combination thereof.

To attain this, the present invention generally comprises a bottom wall, a back wall, a first side wall and a second side wall. The bottom wall and the side walls each has a front edge, and the side and back walls each has a top edge. The bottom wall has a depression therein. The depression is generally positioned in a central area of the bottom wall. A cover portion may be abutted against the top edges of the back and side walls such that the cover portion is spaced from the bottom wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new animal shelter apparatus and method which has many of the advantages of the doghouses mentioned heretofore and many novel features that result in a new animal shelter which is not anticipated, rendered obvious, suggested, or even implied by any of the prior art doghouses, either alone or in any combination thereof.

It is another object of the present invention to provide a new animal shelter which may be easily and efficiently manufactured and marketed.

It is a further object of the present invention to provide a new animal shelter which is of a durable and reliable construction.

An even further object of the present invention is to provide a new animal shelter which is susceptible of a low cost of manufacture with regard to both materials and labor, and which accordingly is then susceptible of low prices of sale to the consuming public, thereby making such animal shelter economically available to the buying public.

Still yet another object of the present invention is to provide a new animal shelter which provides in the apparatuses and methods of the prior art some of the advantages thereof, while simultaneously overcoming some of the disadvantages normally associated therewith.

Still another object of the present invention is to provide a new animal shelter for providing an animal protection from the elements while using the advantages of soil temperature as the seasons change.

Yet another object of the present invention is to provide a new animal shelter which includes a bottom wall, a back wall, a first side wall and a second side wall. The bottom wall and the side walls each has a front edge, and the side and back walls each has a top edge. The bottom wall has a depression therein. The depression is generally positioned in a central area of the bottom wall. A cover portion may be abutted against the top edges of the back and side walls such that the cover portion is spaced from the bottom wall.

Still yet another object of the present invention is to provide a new animal shelter that includes a ventilation system which will additionally aid in cooling the shelter.

Even still another object of the present invention is to provide a new animal shelter that has a series of apertures in the bottom wall for removing any precipitation before it reaches the depression in the bottom wall.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new animal shelter according to the present invention.

FIG. 2 is a schematic back view of the present invention.

FIG. 3 is a schematic perspective view of the present invention.

FIG. 4 is a schematic cross-sectional side view of the present invention.

FIG. 5 is a schematic perspective view of the present invention.

FIG. 6 is a schematic cross-sectional view taken along line 6—6 of FIG. 5 of the present invention.

FIG. 7 is a schematic perspective view of the present invention.

FIG. 8 is a schematic exploded perspective view of the present invention.

DESCRIPTION OF THE PREFERRED EMBODIMENT

With reference now to the drawings, and in particular to FIGS. 1 through 8 thereof, a new animal shelter embodying the principles and concepts of the present invention and generally designated by the reference numeral 10 will be described.

As best illustrated in FIGS. 1 through 8, the animal shelter 10 generally comprises a bottom wall 12, a back wall 13, a first side wall 14 and a second side wall 15. The bottom wall 12 and the side walls 14, 15 each have front edges 16. The side 14, 15 and back 13 walls each have a top edge 17. The bottom wall 12 has a depression 20 therein. The depression 20 is generally positioned in a central area of the bottom wall 12 and ideally has its own central portion which is relatively planar. The bottom wall 12 has a plurality of apertures 21 therein. The apertures 12 are positioned generally along a line and extend between the side walls 14, 15. The apertures 21 are positioned generally between the front edge 16 of the bottom wall 12 and the depression 20. Each of the walls has a generally rectangular shape and is ideally comprised of a plastic material though metal, fiberglass or wood may also be used.

A pair of guide rails 22 are used for guiding a roof member in one embodiment. Each of the guide rails 22 is coupled to one of the top edges 17 of the side walls 14, 15. Each of the guide rails 22 has a channel 23 therein. The channel 23 extends along a length of the guide rails. The guide rails 22 are positioned such that the channels 23 are facing each other.

A covering portion includes a roof member 26. The roof member 26 comprises a first 27 and second plate 28. Each of the plates has a first 29 and second edge 30. The plates 27, 28 are integrally coupled at the first edge 29 such that the plates are in an angular relationship to each other. The roof member 26 has an exterior surface 31 and an interior surface 32. The plates 27, 28 have a back edge 33 and a front edge 34. A panel 35 extends between and is integrally coupled to the interior surface 32 of the first and second plates. The panel 35 is generally positioned adjacent to the back edges 33 of the plates. The panel 35 is positioned such that the panel 35 comprises an extension of the back wall 13 when the cover portion is placed over the bottom wall 12. An angle between the interior surfaces of the plates is preferably between 60 and 90 degrees.

A coupling means removably couples the plates to the side walls. The coupling means comprises a pair of elongate brackets 40. Each has an elongate slot 41 therein such that a pair of legs 42 and a base 43 are defined. One of the legs 42 of the elongate brackets is coupled to one of the interior surfaces 32 of the plates 27, 28 such that the elongate slots 41 are generally opposed to each other. The elongate brackets 40 are positioned such that a free leg 42 of each of the elongate brackets 40 may be slidably received by one of the channels 23 of the guide rails 22. In another embodiment, the guide rails and brackets are not used. This embodiment, depicted in FIGS. 1 through 4, uses a pair of hinges 45 which hingedly couple the panel 35 to the back wall 13 so that the front of the roof member 26 may be lifted upwards.

A ventilation means 50 enhances circulation of air in the shelter. The ventilation means 50 comprises an opening in the panel 35. A plurality of rods 52 extend across and are rotatably mounted in the opening. Each of the rods 52 is generally planar, and each of the rods is generally adjacent to each other such that the rods may be rotated between a closed an open position. The closed position is defined when one rod is abutted against an adjacent rod as would be accomplished by conventional blind-type ventilation means. Alternatively, the rods may be fixed and a covering panel, not shown, may be placed over the ventilation means 50.

A front wall portion 60 has an edge 62, or peripheral edge, adapted for being simultaneously abutted against the front edges 16, 34 of the bottom wall 12, the side walls 14, 15 and the first 27 and second 28 plates. The front wall portion 60 is removably securable to the respective edges by a securing means 64. The securing means 64 ideally comprises a hook and loop securing means though snaps or another other conventional means, permanent or removable, may be used. The front wall portion 60 has a slit 66 therein. The slit 66 extends upwardly from a bottom edge of the front wall portion 60 so that the animal may enter the shelter. The front wall portion 60 is substantially flexible. The front wall portion 60 preferably comprises a plastic but may be a canvas or other such type material.

In use, the owner of the animal digs a hole in the soil so that the depression 20 may be set into the hole. The depression 20 keeps the bottom wall cooler in the summer and warmer in the winter to offer the animal additional comfort. The front wall 60 portion may be removed or added as seen fit by the owner of the animal, and the ventilation means 50 may be opened or closed as weather permits.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal shelter comprising:
    a bottom wall, a back wall, a first side wall and a second side wall, said bottom wall and said side walls each having a front edge, said side and back walls each having a top edge, said bottom wall having a depression therein, said depression being generally positioned in a central area of said bottom wall;
    a cover portion removably mounted on said top edges of said back and side walls such that said cover portion is spaced from said bottom wall; and
        wherein said bottom wall forms a lowermost portion of the animal shelter such that a lower surface of said bottom wall is abuttable against a ground surface.

2. The animal shelter as in claim 1, additionally comprising a coupling means for removably coupling said cover portion to said back wall, said coupling means being a pair of hinges, wherein said cover portion is hingedly coupled to said back wall.

3. The animal shelter as in claim 2, wherein said cover portion includes a roof member comprising a first plate and a second plate, each of said plates having a first and second edge, said plates being integrally coupled together at said first edges such that said plates are in an angular relationship to each other, said roof member having an exterior surface and an interior surface, said plates having a back edge and a front edge, a panel extending between and being integrally coupled to said interior surface of said first and second plates, said panel being generally positioned adjacent to said back edges of said plates, said panel being positioned such that said panel comprises an extension of said back wall when said cover portion is placed over said bottom wall, said panel being hingedly coupled to said bottom wall.

4. The animal shelter as in claim 3, further comprising a ventilation means for enhancing circulation of air in the shelter, said ventilation means including an opening in said panel, a plurality of rods extending across and being rotatably mounted in said opening, each of said rods being generally planar, each of said rods being generally adjacent to each other such that said rods may be rotated between a closed position and an open position, wherein said closed position is defined when one rod is abutted against an adjacent rod.

5. The animal shelter as in claim 3, further comprising a front wall portion having an edge adapted to being abutted against said front edges of said bottom wall, said side walls and said first and second plates, said front wall portion being removably securable to said respective edges by a securing means, said front wall portion having a slit therein, said front wall portion being substantially flexible.

6. The animal shelter as in claim 1, further comprising a pair of guide rails, each of said guide rails being coupled to one of said top edges of said side walls, each of said guide rails having a channel therein, said channel extending along a length of said guide rails, said guide rails being positioned such that said channels are facing each other, wherein said cover portion may be slidably coupled to said guide rails.

7. The animal shelter as in claim 6, wherein said cover portion further comprises:
    a roof member, said roof member comprising a first and second plate, each of said plates having a first and second edge, said plates being integrally coupled at said first edge such that said plates are in an angular relationship to each other, said roof member having an exterior surface and an interior surface, said plates having a back edge and a front edge, a panel extending between and being integrally coupled to said interior surface of said first and second plates, said panel being generally positioned adjacent to said back edges of said plates, said panel being positioned such that said panel comprises an extension of said back wall when said cover portion is placed over said bottom wall;
    a coupling means for removably coupling said plates to said side walls, said coupling means comprising a pair of elongate brackets each having an elongate slot therein such that a pair of legs and a base are defined, one of said legs of said elongate brackets being coupled to one of the interior surfaces of said plates such that said elongate slots are generally opposed to each other, said elongate brackets being positioned such that a free leg of each of said elongate brackets may be slidably received by one of the channels of said guide rails.

8. The animal shelter as in claim 7, further comprising a ventilation means for enhancing circulation of air in the shelter, said ventilation means comprising an opening in said panel, a plurality of rods extending across and being rotatably mounted in said opening, each of said rods being generally planar, each of said rods being generally adjacent to each other such that said rods may be rotated between a closed position and an open position, wherein said closed position is defined when one rod is abutted against an adjacent rod.

9. The animal shelter as in claim 8, further comprising a front wall portion having an edge adapted to being abutted against said front edges of said bottom wall, said side walls and said first and second plates, said front wall portion being removably securable to said respective edges by a securing means, said front wall portion having a slit therein, said front wall portion being substantially flexible.

10. The animal shelter as in claim 1, wherein said bottom wall has a peripheral area surrounding said central area, said central area protruding downwardly from a plane substantially defined by said peripheral area of said bottom wall.

11. The animal shelter as in claim 1, wherein said central area of said bottom wall has a concave upper surface and a convex lower surface for abutting against the ground surface of a hole in the ground.

12. An animal shelter comprising:
    a bottom wall, a back wall, a first side wall and a second side wall, said bottom wall and said side walls each having a front edge, said side and back walls each having a top edge, said bottom wall having a depression therein, said depression being generally positioned in a central area of said bottom wall, said bottom wall having a plurality of apertures therein, said apertures being positioned generally along a line and extending between said side walls, said apertures being positioned generally between said front edge of said bottom wall and said depression, each of said walls having a generally rectangular shape;

a pair of guide rails, each of said guide rails being coupled to one of said top edges of said side walls, each of said guide rails having a channel therein, said channel extending along a length of said guide rails, said guide rails being positioned such that said channels are facing each other;

a cover portion, said cover portion comprising:

a roof member, said roof member comprising a first and second plate, each of said plates having a first and second edge, said plates being integrally coupled at said first edge such that said plates are in an angular relationship to each other, said roof member having an exterior surface and an interior surface, said plates having a back edge and a front edge, a panel extending between and being integrally coupled to said interior surface of said first and second plates, said panel being generally positioned adjacent to said back edges of said plates, said panel being positioned such that said panel comprises an extension of said back wall when said cover portion is placed over said bottom wall, wherein an angle between the interior surfaces of said plates is generally between 60 and 90 degrees;

a coupling means for removably coupling said plates to said side walls, said coupling means comprising a pair of elongate brackets each having an elongate slot therein such that a pair of legs and a base are defined, one of said legs of said elongate brackets being coupled to one of the interior surfaces of said plates such that said elongate slots are generally opposed to each other, said elongate brackets being positioned such that a free leg of each of said elongate brackets may be slidably received by one of the channels of said guide rails;

a ventilation means for enhancing circulation of air in the shelter, said ventilation means comprising an opening in said panel, a plurality of rods extending across and being rotatably mounted in said opening, each of said rods being generally planar, each of said rods being generally adjacent to each other such that said rods may be rotated between a closed position and an open position, wherein said closed position is defined when one rod is abutted against an adjacent rod; and a front wall portion, said front wall having an edge adapted to being abutted against said front edges of said bottom wall, said side walls and said first and second plates, said front wall portion being removably securable to said respective edges by a securing means, said securing means comprising a hook and loop securing means, said front wall portion having a slit therein, said slit extending upwardly from a bottom edge of said front wall portion, said front wall portion being substantially flexible, said front wall portion comprising a plastic.

13. An animal shelter comprising:

a bottom wall, a back wall, a first side wall and a second side wall, said bottom wall and said side walls each having a front edge, said side and back walls each having a top edge, said bottom wall having a depression therein, said depression being generally positioned in a central area of said bottom wall;

a cover portion, said cover portion being abuttable against said top edges of said back and side walls such that said cover portion is spaced from said bottom wall;

a pair of guide rails, each of said guide rails being coupled to one of said top edges of said side walls, each of said guide rails having a channel therein, said channel extending along a length of said guide rails, said guide rails being positioned such that said channels are facing each other; and wherein said cover portion may be slidably coupled to said guide rails and wherein said bottom wall defines a lowermost portion of the animal shelter and is abuttable against a ground surface.

14. The animal shelter as in claim 13, wherein said cover portion further comprises:

a roof member, said roof member comprising a first and second plate, each of said plates having a first and second edge, said plates being integrally coupled at said first edge such that said plates are in an angular relationship to each other, said roof member having an exterior surface and an interior surface, said plates having a back edge and a front edge, a panel extending between and being integrally coupled to said interior surface of said first and second plates, said panel being generally positioned adjacent to said back edges of said plates, said panel being positioned such that said panel comprises an extension of said back wall when said cover portion is placed over said bottom wall;

a coupling means for removably coupling said plates to said side walls, said coupling means comprising a pair of elongate brackets each having an elongate slot therein such that a pair of legs and a base are defined, one of said legs of said elongate brackets being coupled to one of the interior surfaces of said plates such that said elongate slots are generally opposed to each other, said elongate brackets being positioned such that a free leg of each of said elongate brackets may be slidably received by one of the channels of said guide rails.

15. The animal shelter as in claim 14, further comprising a ventilation means for enhancing circulation of air in the shelter, said ventilation means comprising an opening in said panel, a plurality of rods extending across and being rotatably mounted in said opening, each of said rods being generally planar, each of said rods being generally adjacent to each other such that said rods may be rotated between a closed position and an open position, wherein said closed position is defined when one rod is abutted against an adjacent rod.

16. The animal shelter as in claim 15, further comprising a front wall portion having an edge adapted to being abutted against said front edges of said bottom wall, said side walls and said first and second plates, said front wall portion being removably securable to said respective edges by a securing means, said front wall portion having a slit therein, said front wall portion being substantially flexible.

* * * * *